(12) United States Patent
Akagi et al.

(10) Patent No.: US 9,202,504 B2
(45) Date of Patent: Dec. 1, 2015

(54) PRODUCING A MAGNETIC DISK DEVICE

(75) Inventors: Kyo Akagi, Tokyo (JP); Satoshi Hashimoto, Kanagawa (JP); Kensuke Ishiwata, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 989 days.

(21) Appl. No.: 12/910,752

(22) Filed: Oct. 22, 2010

(65) Prior Publication Data

US 2011/0094091 A1    Apr. 28, 2011

(30) Foreign Application Priority Data

Oct. 23, 2009 (JP) ................................. 2009-244192

(51) Int. Cl.
  *G11B 5/84* (2006.01)
  *G11B 33/14* (2006.01)

(52) U.S. Cl.
  CPC ................ *G11B 5/84* (2013.01); *G11B 33/146* (2013.01); *G11B 33/148* (2013.01); *G11B 33/1466* (2013.01); *G11B 33/1486* (2013.01); *Y10T 29/49021* (2015.01); *Y10T 29/49025* (2015.01); *Y10T 29/49028* (2015.01); *Y10T 29/49776* (2015.01)

(58) Field of Classification Search
  CPC .... G11B 5/84; G11B 33/146; G11B 33/1466; G11B 33/148; G11B 33/1486; Y10T 29/49021; Y10T 29/49025; Y10T 29/49028; Y10T 29/49776
  USPC ............... 29/603.03, 603.05, 603.08, 407.08; 277/650; 360/75, 97.02, 97.13, 97.22, 360/99.15, 99.18, 99.21, 137
  See application file for complete search history.

(56) References Cited

U.S. PATENT DOCUMENTS

| | | | | |
|---|---|---|---|---|
| 4,789,913 A | * | 12/1988 | Gregory et al. | 360/97.13 |
| 5,636,081 A | * | 6/1997 | Higashiya et al. | 360/99.18 |
| 6,785,082 B2 | | 8/2004 | Fiorvanti et al. | |
| 6,819,517 B2 | * | 11/2004 | Fioravanti et al. | 360/75 |
| 6,889,984 B2 | * | 5/2005 | Hatanaka | 277/650 |
| 6,999,262 B2 | * | 2/2006 | Han et al. | |
| 7,271,974 B2 | | 9/2007 | Fukuyama et al. | |
| 7,362,541 B2 | * | 4/2008 | Bernett et al. | 360/99.21 |
| 7,852,595 B2 | | 12/2010 | Kitahori et al. | |

(Continued)

FOREIGN PATENT DOCUMENTS

| | | | |
|---|---|---|---|
| JP | 05266647 A | * | 10/1993 |
| JP | 2005507540 | | 3/2005 |

(Continued)

*Primary Examiner* — A. Dexter Tugbang

(57) ABSTRACT

A method for producing a magnetic disk device includes injecting replacement gas into a hermetically-sealed enclosure by means of an injection nozzle while suctioning gas from inside of the hermetically-sealed enclosure by means of a suction nozzle in such a way that the gas pressure inside of the enclosure does not fall below the vapor pressure of the organic compounds present inside of the enclosure, wherein the hermetically-sealed enclosure houses within a magnetic disk for storing data, a magnetic head for writing/reading the data, and an actuator for moving the magnetic head relative to the magnetic disk, and wherein a gas injection port and a gas expulsion port are formed in the hermetically-sealed enclosure and provide communication between the inside and outside, wherein an injection nozzle is disposed at the gas injection port and a suction nozzle is disposed at the gas expulsion port.

9 Claims, 9 Drawing Sheets

(56) References Cited

U.S. PATENT DOCUMENTS

2008/0174910 A1* 7/2008 Hirono et al. ............. 360/97.02
2009/0135517 A1* 5/2009 Kitahori et al. ................ 360/75
2009/0300907 A1 12/2009 Akagi et al.

FOREIGN PATENT DOCUMENTS

| JP | 2006040423 | | 2/2006 |
|----|------------|---|--------|
| JP | 2009-129529 | | 6/2009 |
| JP | 2009166065 A | * | 7/2009 |

* cited by examiner

PRODUCING A MAGNETIC DISK DEVICE

CROSS REFERENCE TO RELATED APPLICATION

This application claims priority from the Japanese Patent Application No. 2009-244192, filed Oct. 23, 2009, the disclosure of which is incorporated herein in its entirety by reference.

FIELD OF THE INVENTION

The present technology relates generally to the magnetic disk device field.

BACKGROUND OF THE INVENTION

In magnetic disk devices such as hard disks, a plurality of tracks arrayed in a concentric circular fashion are formed on a magnetic disk and servo data is written to each track. This servo data includes address data and burst signals and is used to control the position of a magnetic head.

One method of writing in servo data is known as self-servo write (SSW), which involves assembling a magnetic disk device and then controlling the magnetic head and actuator which are housed inside of the enclosure in order to write servo data to the magnetic disk.

Figure 1:
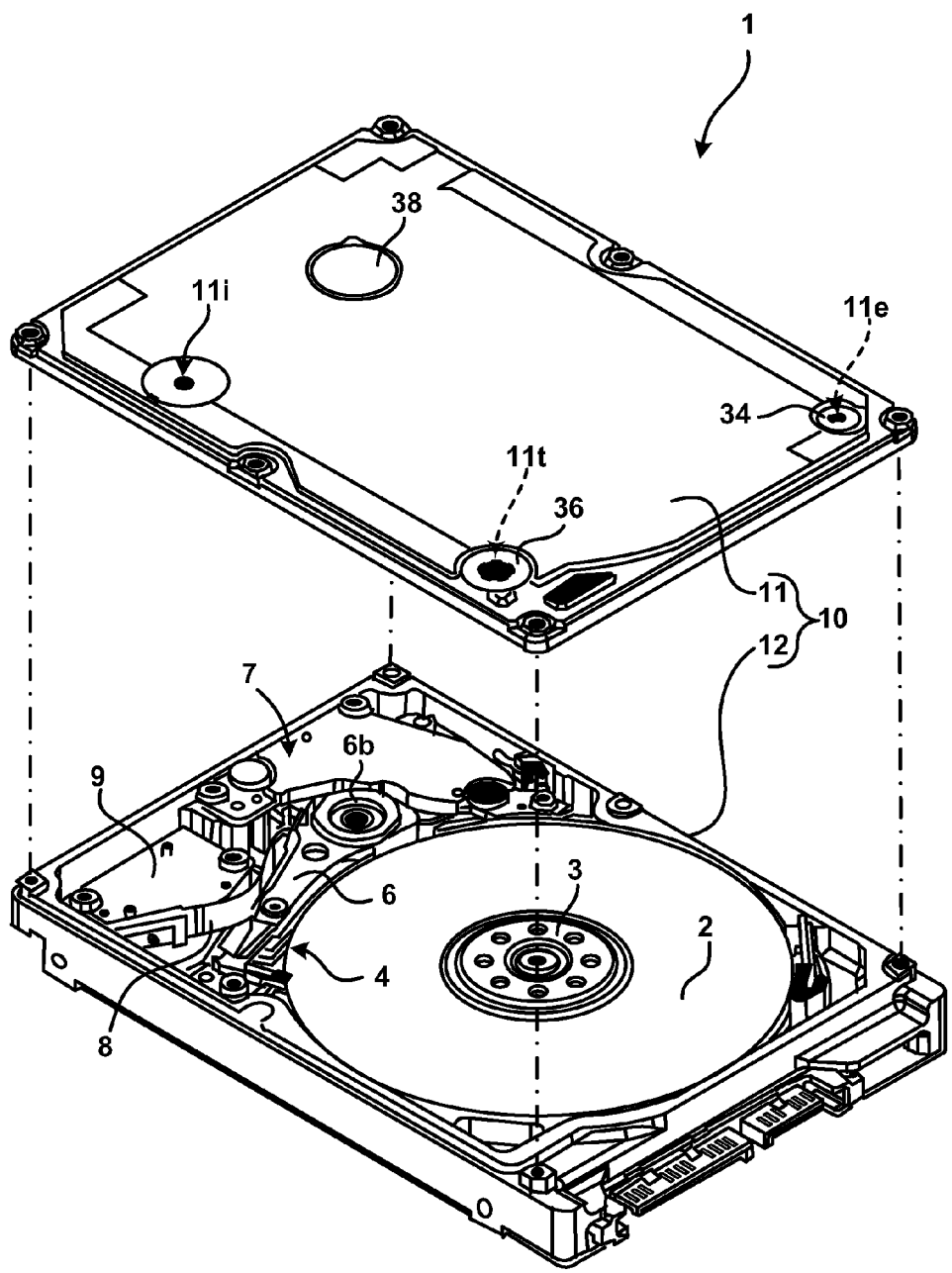
FIG. 1 is an oblique exploded view showing an exemplary configuration of the magnetic disk device, in accordance with one embodiment of the present technology.

The drawings referred to in this description should not be understood as being drawn to scale unless specifically noted.

DESCRIPTION OF EMBODIMENTS

The discussion will begin with an overview of the general method currently being used for replacing gas in an enclosure of a magnetic disk device, and a brief description of the method for replacing gas in the enclosure according to embodiments of the present technology. The discussion will then focus on a more detailed description of embodiments of the present technology that provide a method for producing a magnetic disk device.

Overview

In general, technology for self-servo writing includes an enclosure of a magnetic disk device being filled with a low-density gas such as He (helium). With this technology, the operation to replace the gas inside of the enclosure is performed outside a clean room, and therefore filters are disposed at the gas injection port and gas expulsion port, respectively, and the replacement gas is injected into the enclosure through the filter disposed at the gas injection port by means of an injection nozzle.

In this regard, the present inventors carried out investigations into effectively replacing the gas inside of the enclosure, in which a suction nozzle is disposed at the gas expulsion port and the replacement gas is injected into the enclosure by means of an injection nozzle while gas is suctioned from inside of the enclosure by means of this suction nozzle. In this case, however, the grease etc. used in the spindle motor and the liquid organic compounds present inside of the enclosure are vaporized, and it was confirmed that there was a risk of the level of cleanliness inside of the enclosure being impaired.

Embodiments of the present technology were devised in view of the situation outlined above, and the main aim of the present technology is to provide a method for producing a magnetic disk device with which it is possible to effectively replace the gas inside of the enclosure.

In order to resolve the issues mentioned above, the method for producing a magnetic disk device according to the present technology is a method in which a magnetic disk for storing data, a magnetic head for writing/reading the data, and an actuator for moving the magnetic head relative to the magnetic disk are housed inside a hermetically-sealed enclosure; a gas injection port and a gas expulsion port which provide communication between the inside and outside are formed in the enclosure; and filters are disposed at the gas injection port and gas expulsion port, respectively, wherein: an injection nozzle is disposed at the gas injection port; a suction nozzle is disposed at the gas expulsion port; and replacement gas is injected into the enclosure by means of the injection nozzle while gas is suctioned from inside of the enclosure by means of the suction nozzle in such a way that the gas pressure inside of the enclosure does not fall below the vapor pressure of the organic compounds present inside of the enclosure.

In one embodiment of the present technology, wherein the gas may be suctioned from inside of the enclosure by means of the suction nozzle in such a way that the gas pressure inside of the enclosure does not fall below atmospheric pressure.

In one embodiment of the present technology, the gas pressure inside of the injection nozzle and the gas pressure inside of the suction nozzle are detected, and the gas pressure inside of the enclosure is obtained on the basis of the following formula 1.

$$\left(\frac{c_1}{c_2}\right)^2 \cdot \left(\frac{d_{in}}{d_{out}}\right)^4 = \frac{P_2 - P_3}{P_1 - P_2} \qquad \text{[Formula 1]}$$

In the formula, $P_1$ is the gas pressure inside of the injection nozzle, $P_2$ is the gas pressure inside of the enclosure, $P_3$ is the gas pressure inside of the suction nozzle, $d_{in}$ is the diameter of the gas injection port, $d_{out}$ is the diameter of the gas expulsion port, $c_1$ is the flow rate coefficient of the filter disposed at the gas injection port, and $c_2$ is the flow rate coefficient of the filter disposed at the gas expulsion port.

In one embodiment of the present technology, the magnetic disk is caused to rotate while the replacement gas is being injected.

In one embodiment of the present technology, the replacement gas is a low-density gas of lower density than air.

In one embodiment of the present technology, the low-density gas is injected into the enclosure, after which the magnetic head and actuator are controlled in order to write servo data to the magnetic disk.

In one embodiment of the present technology, an indicator which varies in accordance with the concentration of low-density gas inside of the enclosure is acquired while the low-density gas is being injected into the enclosure in order to evaluate the concentration of low-density gas inside of the enclosure.

The following discussion will address the structure of the components enabling the method for producing a magnetic disk device. The discussion will then address the method followed by a components in operation.

Example Structure

FIG. 1 is an oblique exploded view showing an exemplary configuration of a magnetic disk device 1 according to one embodiment of the present technology. An enclosure 10 (DE: disk enclosure) of the magnetic disk device 1 comprises a rectangular box-like base 12 which opens upward, and a plate-like cover 11 for covering the base, and the enclosure is hermetically sealed by mounting the cover 11 on the base 12.

A magnetic disk 2 and head assembly 6, among other things, are housed inside of the enclosure 10. The magnetic disk 2 is mounted on a spindle motor 3 which is provided on the bottom of the base 12. A plurality of tracks (not depicted) arranged in concentric circles are formed on the magnetic disk 2, and servo data is written to each track at a specific period. The servo data includes address data and burst signals.

The head assembly 6 is supported beside the magnetic disk 2. A magnetic head 4 is supported at the tip end of the head assembly 6. The magnetic head 4 floats above the rotating magnetic disk 2 in close proximity thereto, and carries out data writing and reading. Meanwhile, a voice coil motor 7 is provided at the rear end of the head assembly 6. The voice coil motor 7 drives the rotation of the head assembly 6 and causes the magnetic head 4 to move in substantially the radial direction of the magnetic disk 2.

Furthermore, FPCs (Flexible Printed Circuits) 8 are fitted to the head assembly 6. These FPCs 8 extend from a connector 9 which is provided on the bottom of the base 12, and they electrically connect a circuit substrate (not depicted) provided on the rear surface of the base 12, and the magnetic head 4 and voice coil motor 7.

Figure 2:
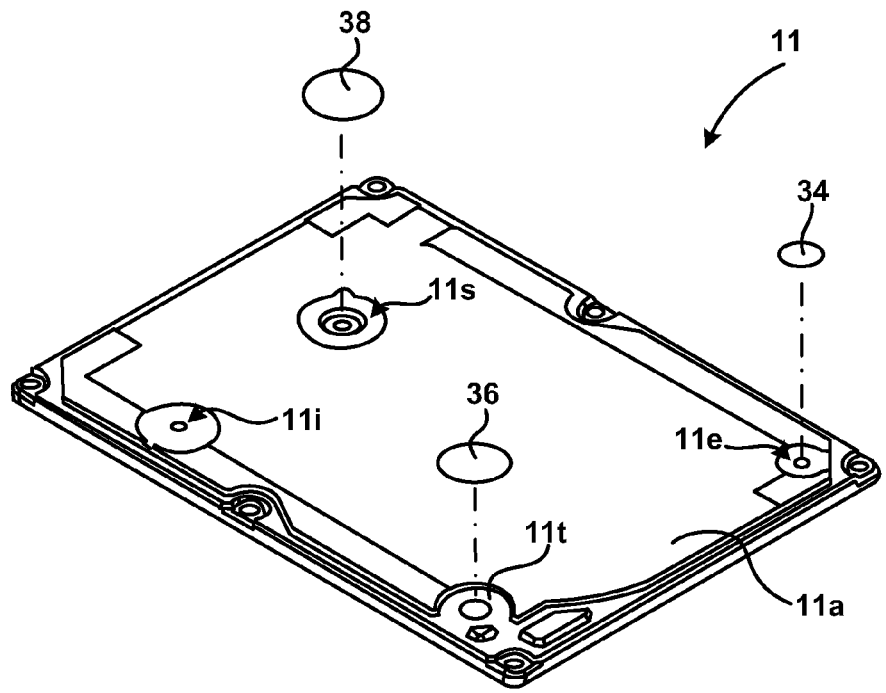
FIG. 2 is an oblique exploded view showing an exemplary configuration of the cover which is part of the enclosure, in accordance with one embodiment of the present technology.
Figure 2:
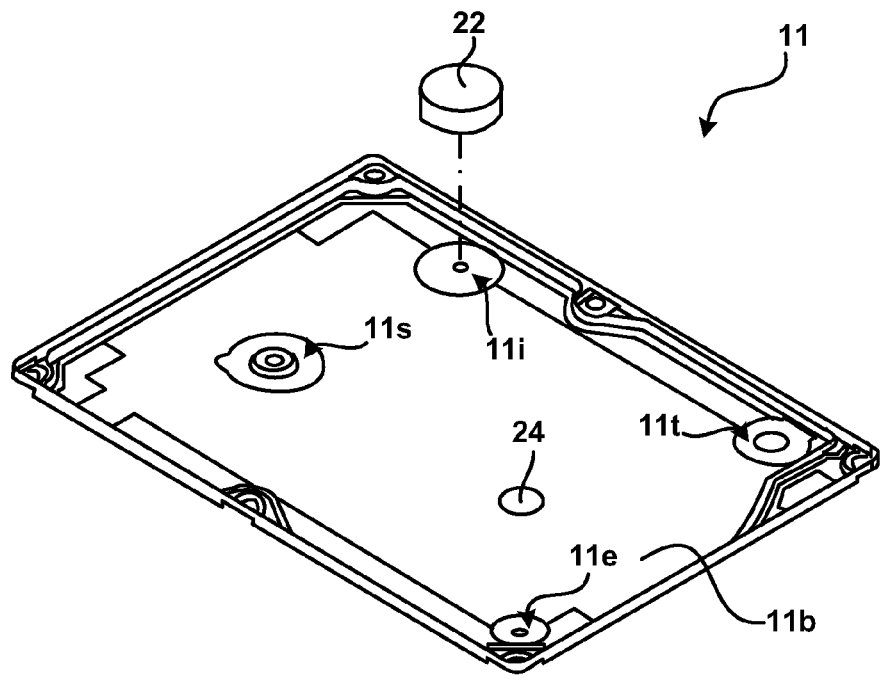

FIG. 2 shows an oblique exploded view of the cover 11 which makes up part of the enclosure 10. FIG. 2(a) shows the surface 11a side of the cover 1, and FIG. 2(b) shows the rear surface 11b side of the cover 11.

A gas injection port 11i and gas expulsion port 11e which provide communication between the inside and outside of the enclosure 10, a test port 11t and a screw hole 11s are formed in the cover 11. It should be noted that the gas injection port 11i and gas expulsion port 11e may be formed on the base 12.

The gas injection port 11i constitutes what is known as a breathing port and is provided in order to suppress a difference in gas pressure between the inside and outside of the enclosure 10. Furthermore, the gas injection port 11i is used when the inside of the enclosure 10 is filled with gas during production, as will be described later.

A flat, cylindrical breathing filter 22 is provided at the gas injection port 11i on the rear surface 11b side of the cover 11. To be more specific, the breathing filter 22 is mounted on the rear surface 11b of the cover 11 in such a way as to close off the gas injection port 11i. The breathing filter 22 filters the gas flowing into the enclosure 10, thereby suppressing the ingress of particles contained in the gas into the enclosure 10.

Furthermore, the gas injection port 11i is formed in a position such that the breathing filter 22 which is mounted on the rear surface 11b side of the cover 11 is installed between the head assembly 6 and the connector 9 (see FIG. 1).

The gas expulsion port 11e is used when the inside of the enclosure 10 is filled with gas during production, as will be described later. A sheet-like filter 24 made of nonwoven fabric is provided on the rear surface 11b side of the cover 11 at the gas expulsion port 11e. Furthermore, a leak seal 34 is affixed to the gas expulsion port 11e on the surface 11a side of the cover in order to close off said gas expulsion port.

The test port 11t is used for testing during production, as will be described later. A leak seal 36 is affixed to the test port 11t on the surface 11a side of the cover 11 in order to close off said test port. It should be noted that no filter is provided on the test port 11t.

The screw hole 11s is a hole into which is inserted a screw that is tightened by a bearing part 6b of the head assembly 6. A leak seal 38 is affixed to the screw hole 11s on the surface 11a side of the cover 11 in order to close off said screw hole.

In this case, the breathing filter 22 which is provided at the gas injection port 11i has a higher filtering capacity for particles contained in gas than the filter 24 which is provided at the gas expulsion port 11e. There are various kinds of particles contained in the gas, including not only dust particles, but also moisture particles and particles of chemical substances, among others. The breathing filter 22 includes, among other things, a helical flow path part for maintaining the flow path length, activated carbon for adsorbing moisture, and a chemical adsorption filter for adsorbing chemical substances, as well as a sheet-like filter made of nonwoven fabric which is the same as the filter 24. For this reason, the breathing filter 22 can filter a wider range of particles and can maintain this filtering over a longer period of time than the filter 24, so it can be said to have a high filtering capacity.

It should be noted that in this mode of embodiment, the sheet-like filter 24 is provided at the gas expulsion port 11e, but this is not limiting, and a breathing filter which is the same as the breathing filter 22 may also be provided at the gas expulsion port 11e so that the gas expulsion port 11e acts as a breathing port. In this case there is no need to affix the leak seal 38 to the gas expulsion port 11e.

Example Operation

Figure 3:
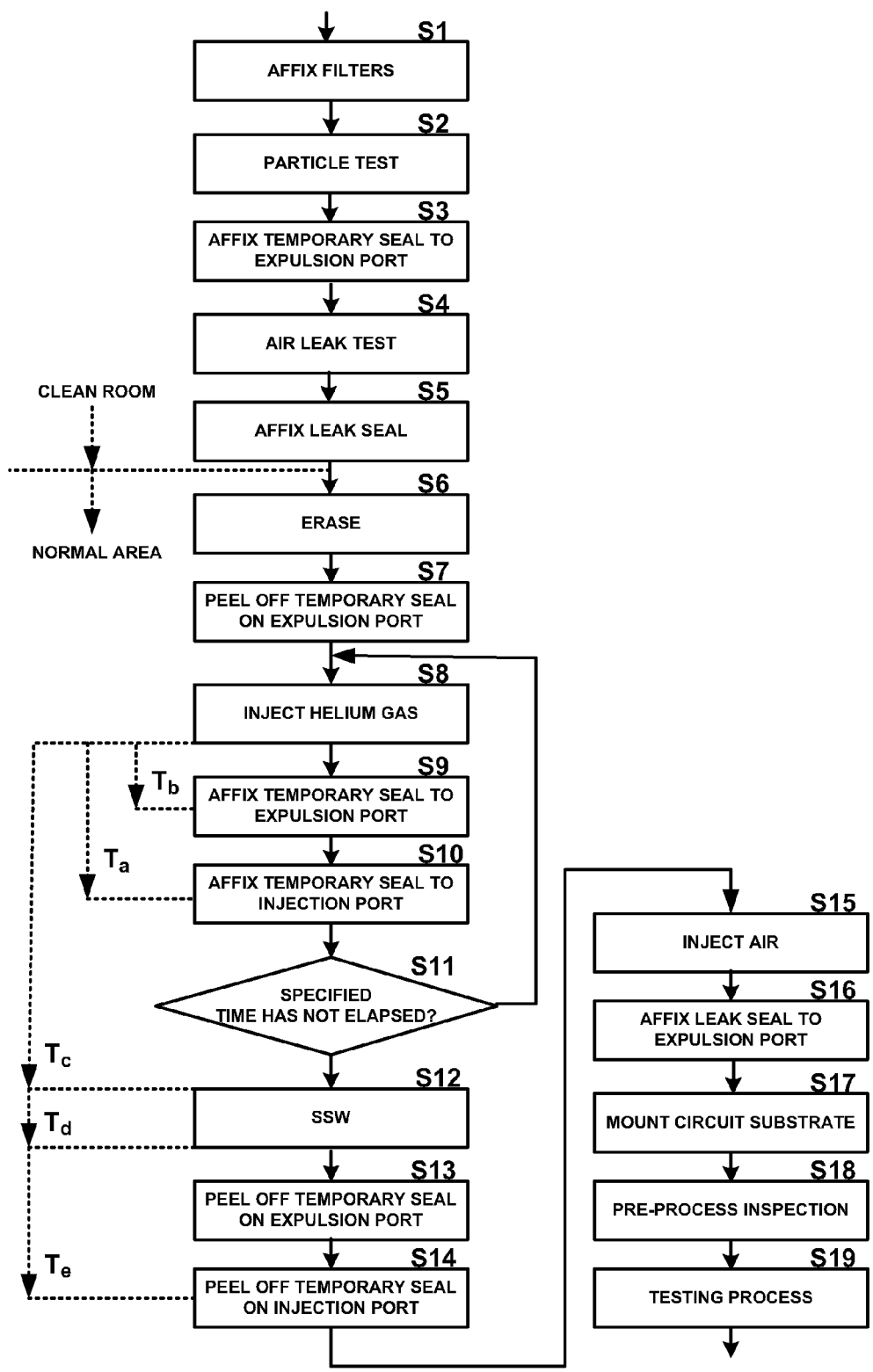
FIG. 3 is a flowchart showing an example method for producing a magnetic disk device, in accordance with one embodiment of the present technology.

FIG. 3 is a flowchart of an example method for producing the magnetic disk device 1 according to one mode of embodiment of the present invention. The main aim of the production method is to perform self-servo write (SSW) while the enclosure 10 is filled with He (helium).

Steps S1 to S5 are first of all carried out in a clean room. In S1, the breathing filter 22 and filter 24 are affixed to the rear surface 11b of the cover 11. That is, the breathing filter 22 is attached to the rear surface 11b of the cover 11 in such a way as to close off the gas injection port 11i, and the filter 24 is attached to the rear surface 11b of the cover 11 in such a way as to close off the gas expulsion port 11e, as shown in FIG. 2(b). The cover 11 to which the breathing filter 22 and filter 24 have been attached is then mounted on the base 12 which houses the magnetic disk 2 and head assembly 6 etc., and the enclosure 10 is hermetically sealed. In S2, a particle test inside of the hermetically-sealed enclosure 10 is carried out. To be more specific, a detector for detecting the particle count is inserted into the enclosure 10 from the test port 11t in order to carry out the measurement. It should be noted that the detector is inserted into the test port 11*t* in this manner and therefore it is not possible to provide a filter therein as in the gas injection port 11*i* and gas expulsion port 11*e*. Furthermore, the detector is inserted into the test port 11*t* which therefore has a larger diameter than the gas injection port 11*i* and gas expulsion port 11*e*.

Figure 4:
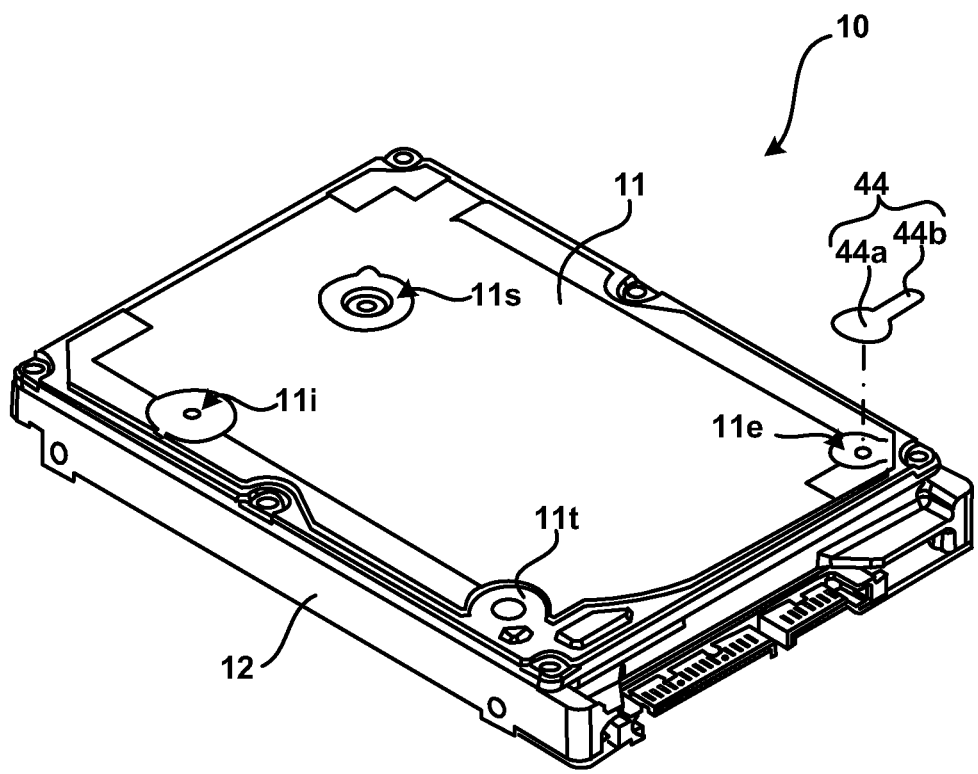
FIG. 4 is an oblique view of a temporary seal being affixed, in accordance with one embodiment of the present technology.

In S3, a temporary seal 44 is affixed as shown in FIG. 4 in order to temporarily close off the gas expulsion port 11*e*. The temporary seal 44 comprises a closure part 44*a* for closing off the gas expulsion port 11*e*, and a gripping part 44*b* which extends in one direction from the closure part 44*a*, the presence of the gripping part 44*b* facilitating peeling of the temporary seal.

The temporary seal 44 is affixed in this manner in order to prevent, as far as possible, particles from passing through the filter 24 from the gas expulsion port 11*e* and entering the enclosure 10 during the time until the He injection step (S8) begins (to be described later). It should be noted that there is no need to affix the temporary seal 44 if the filter 24 has sufficient filtering capacity.

In this instance, the filter 24 provided at the gas expulsion port 11*e* has a lower filtering capacity than the breathing filter 22 provided at the gas injection port 11*i* and therefore the gas expulsion port 11*e* is closed off. This is not limiting either, and it is equally feasible for both the gas expulsion port 11*e* and gas injection port 11*i* to be temporarily closed off.

In S4, air is injected from the test port 11*t* in order to carry out an air leak test. This makes it possible to confirm that air does not leak from inside of the enclosure 10, in other words that the enclosure 10 provides adequate hermetic sealing.

Here the gas expulsion port 11*e* in the product magnetic disk device 1 is closed off by means of the leak seal 34 (see FIG. 1), and therefore the air leak test can be carried out under the same conditions as for the product magnetic disk device 1 by closing off the gas expulsion port 11*e* using the temporary seal 44 prior to the air leak test.

Figure 5:
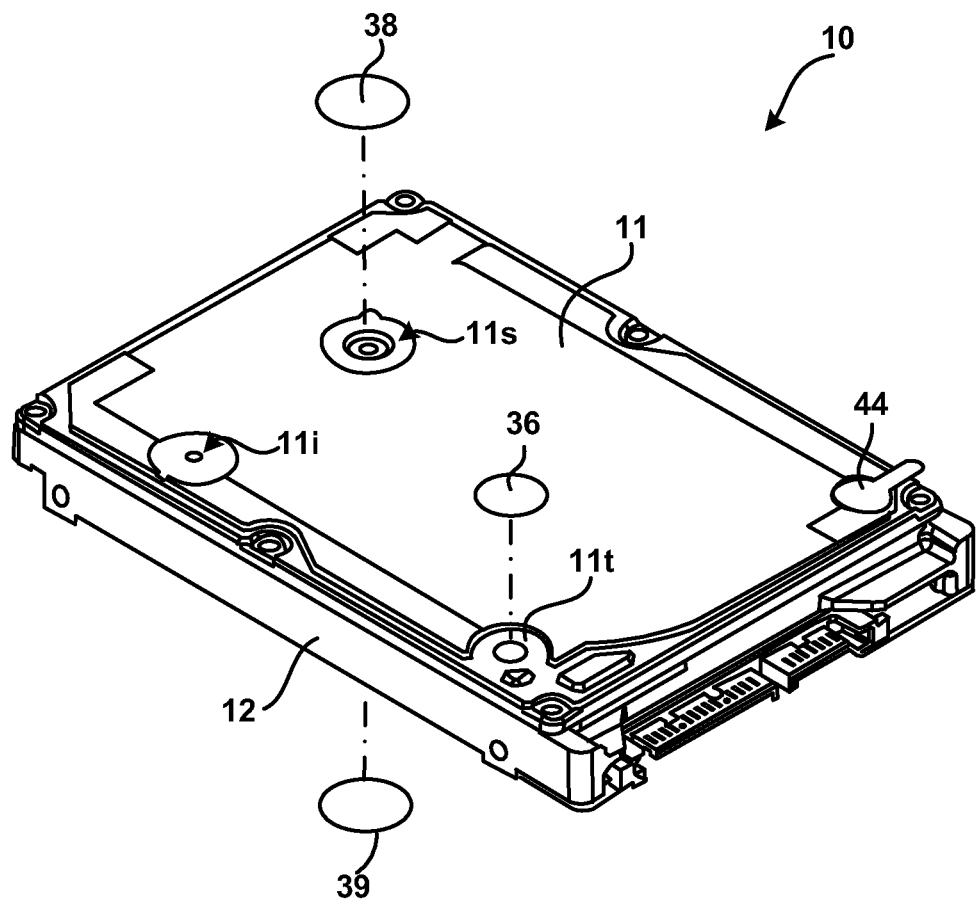
FIG. 5 is an oblique view of a leak seal being affixed, in accordance with one embodiment of the present technology.

In S5, the leak seal 36 is affixed in order to close off the test port 11*t*, as shown in FIG. 5. In addition, the screw hole 11*s* which is formed in the cover 11 is closed off by means of the leak seal 38, and a similar screw hole (not depicted) which is formed in the rear surface of the base 12 is also closed off by means of a leak seal 39.

The screw hole 11*s* is sealed off, in this case, in order to restrict leakage from inside of the enclosure 10 of the He which is injected into the enclosure 10 during the He injection step (S8) which will be described later. That is to say, the previous air leak test (S4) is carried out in order to confirm that air does not leak from the enclosure 10, but there is a risk of the He which is injected in the subsequent step S8 leaking from smaller gaps through which air would not leak. For this reason, gaps through which He risks leaking, such as the screw hole 11*s*, are closed off during this step. It is also feasible to close off the gap where the cover 11 and base 12 are joined, among others.

It should be noted that the test port 11*t* is used for the particle test and air leak test after the enclosure 10 has been hermetically sealed, as described above, and therefore it is not possible to provide a filter therein. Consequently, in this mode of embodiment, the test port 11*t* cannot be used as an opening for gas injection or gas expulsion, as will be described later.

Once the above steps S1 to S5 have been completed, the enclosure 10 is removed from the clean room and transferred to a normal area (an area where the air purity is not controlled). The subsequent steps S6 to S19 are carried out in the normal area.

In S6, the whole magnetic disk 2, which is housed inside of the enclosure 10, is subjected to AC erasing. This erasing is carried out by means of a dedicated erasing apparatus, for example.

In S7, the temporary seal 44 which closes off the gas expulsion port 11*e* (see FIG. 4) is peeled off in order to carry out the subsequent He injection step (S8). In this instance, the He injection step (S8) is carried out in the normal area and therefore the gas expulsion port 11*e* is temporarily closed off until the He injection begins in order to prevent, as far as possible, particles from passing through the filter 24 from the gas expulsion port 11*e* and entering the enclosure 10.

In S8, He is injected into the hermetically-sealed enclosure 10 using the gas injection port 11*i* and gas expulsion port 11*e*. This is done so that self-servo write can be carried out while the enclosure 10 is filled with He. It should be noted that, in this mode of embodiment, He is used as the low-density gas of lower density than air, but this is not limiting, and it is equally feasible to use hydrogen or the like.

Figure 6:
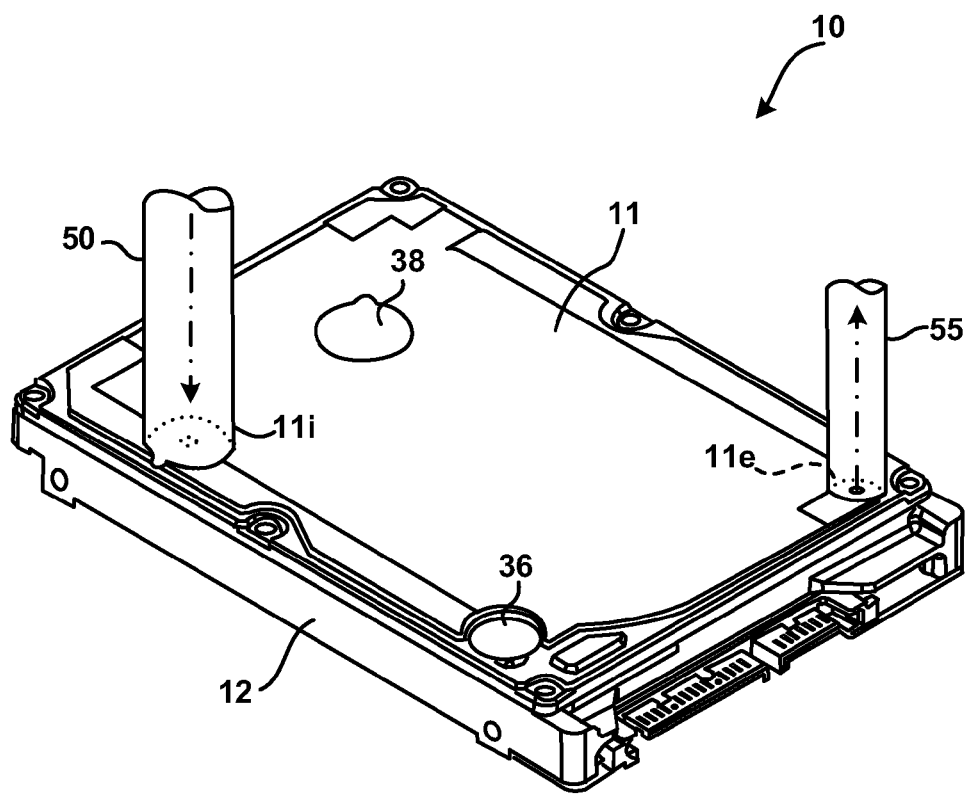
FIG. 6 is an oblique view of an enclosure in which air inside of the enclosure is being replaced with He, in accordance with one embodiment of the present technology.

The He which is the replacement gas can be injected using a gas injection apparatus, for example. To be more specific, and as shown in FIG. 6, an injection nozzle 50 of the gas injection apparatus is disposed at the gas injection port 11*i* and a suction nozzle 55 is disposed at the gas expulsion port 11*e*, and the He is injected into the enclosure 10 by means of the injection nozzle 50 while the gas (mainly air) is suctioned from inside of the enclosure 10 by means of the suction nozzle 55. In this way the air inside of the enclosure 10 is replaced with He.

In this instance, the breathing filter 22 and filter 24 are disposed at the gas injection port 11*i* and gas expulsion port 11*e*, respectively, of the enclosure 10, and therefore the He can be injected in the normal area. That is to say, there is no need for the He to be injected in an environment where the air purity is higher, such as a clean room, which means that production can be simplified.

Furthermore, the breathing filter 22 which is disposed at the gas injection port 11*i* has a higher filtering capacity than the filter 24 disposed at the gas expulsion port 11*e*, and therefore it is possible to effectively suppress the ingress of particles into the enclosure 10 as He is injected from the gas injection port 11*i*, even if the He fed in from the gas injection apparatus contains particles.

Figure 9:
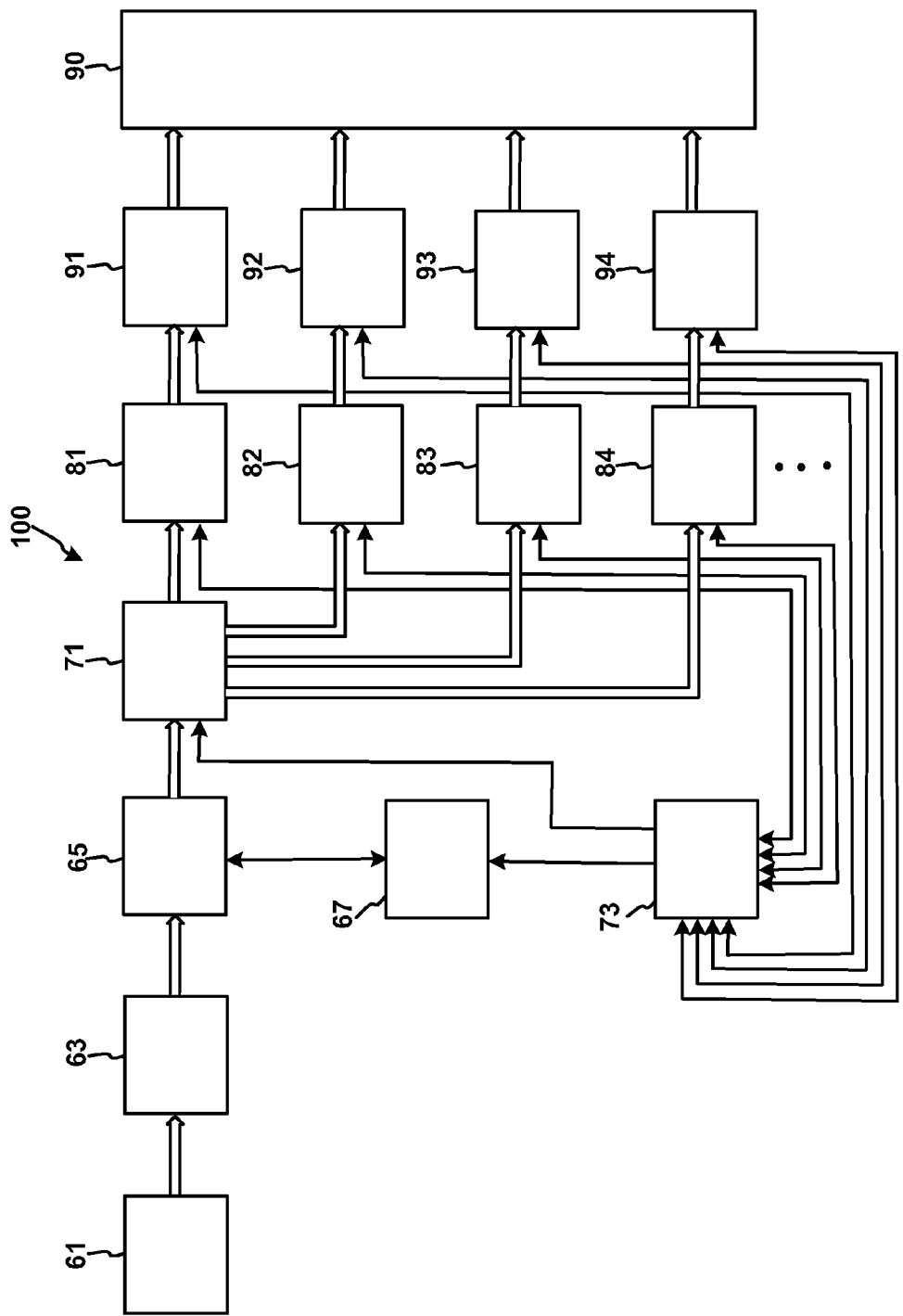
FIG. 9 is a block diagram of an example configuration of a gas injection apparatus, in accordance with one embodiment of the present technology.

FIG. 9 shows an exemplary configuration of a gas injection apparatus 100. In this figure, the white arrows represent the flow of gas and the black arrows represent the flow of control signals.

The gas injection apparatus 100 has a plurality of fixtures 81-84 where a plurality of enclosures 10 are set, respectively. Each fixture 81-84 has the injection nozzle 50 and suction nozzle 55 shown in FIG. 6, described above. The injection nozzle 50 is positioned at the gas injection port 11*i* of the enclosure 10 in order to inject He into the enclosure 10 through the injection port 11*i*. Furthermore, the suction nozzle 55 is positioned at the gas expulsion port 11*e* of the enclosure 10 in order to suction gas from inside of the enclosure 10 through the gas expulsion port 11*e*.

Furthermore, the configuration of the gas injection apparatus 100 for supplying He includes: a gas supply source 61 consisting of an He cylinder or the like; a pressure regulator 63 for regulating the pressure of the He supplied; a flow rate control valve 65 for controlling the flow rate of He supplied; and a flow rate controller 67 for controlling the flow rate control valve 65. The flow rate control valve 65 has a sensor for detecting the flow rate of He, and the detected He flow rate is fed back to the flow rate controller 67. The flow rate control valve 65 detects the overall He flow rate supplied to the plurality of enclosures 10, while also controlling the overall flow rate of He which is supplied to the plurality of enclosures 10. The flow rate controller 67 drives the flow rate control valve 65 in such a way that the He flow rate is maintained at the required level.

Furthermore, the configuration of the gas injection apparatus 100 for distributing He includes: a branch valve 71 for distributing He from the flow rate control valve 65 to each of the fixtures 81-84; and a fixture management controller 73 for controlling the branch valve 71. The gas injection apparatus 100 also has, in each of the flow paths heading from the branch valve 71 toward the fixtures 81-84, a plurality of pressure sensors (not depicted) for detecting the gas pressure inside the injection nozzle 50. Each pressure sensor feeds back the detected gas pressure inside the injection nozzle 50 to the flow rate controller 67.

Furthermore, the configuration of the gas injection apparatus 100 for evacuating gas includes: a gas evacuation apparatus 90; and a plurality of evacuation control valves 91-94 which are provided correspondingly with each of the fixtures 81-84 and control the flow rate of the gas to be evacuated. Each of the evacuation control valves 91-94 is controlled by means of the fixture management controller 73. Furthermore, each of the evacuation control valves 91-94 has a sensor (not depicted) for detecting the flow rate of gas, and the detected gas flow rate is fed back to the flow rate controller 67. The flow rate controller 67 drives each of the evacuation control valves 91-94 in such a way that the gas flow rate is maintained at the required level.

The gas injection apparatus 100 also has, in each of the flow paths heading from the fixtures 81-84 toward the evacuation control valves 91-94, a plurality of pressure sensors (not depicted) for detecting the gas pressure inside the suction nozzle 55. Each pressure sensor feeds back the detected gas pressure inside the suction nozzle 55 to the flow rate controller 67.

The flow rate controller 67 controls the flow rate control valve 65 and evacuation control valves 91-94 in such a way that the gas pressure inside each enclosure 10 is kept in a specified range, in accordance with at least the following: the overall He flow rate fed back from the flow rate control valve 65; the pressure inside the injection nozzle 50 which is fed back from each of the pressure sensors on the supply side; the gas flow rate fed back from each of the evacuation control valves 91-94; and the pressure inside the suction nozzle 55 which is fed back from each of the pressure sensors on the evacuation side.

Here, the gas pressure inside the enclosure 10 is derived in the following manner. First of all, the flow rate $Q_1$ of He which is injected into the enclosure 10 through the gas injection port 11i is represented by formula 2 below, and the flow rate $Q_2$ of the gas expelled from inside of the enclosure 10 through the gas expulsion port 11e is represented by formula 3 below. Then, if the flow rate $Q_1$ of He which is injected into the enclosure 10 through the gas injection port 11i is made equal to the flow rate $Q_2$ of the gas expelled from inside of the enclosure 10 through the gas expulsion port 11e, the abovementioned formula 1 is obtained from formulae 2 and 3. The gas pressure $P_2$ inside the enclosure 10 is obtained by means of this.

$$Q_1 = c_1 \cdot \frac{\pi}{4} \cdot d_{in}^2 \sqrt{\frac{2 \cdot (P_1 - P_2)}{\rho}} \quad \text{[Formula 2]}$$

$$Q_2 = c_2 \cdot \frac{\pi}{4} \cdot d_{out}^2 \sqrt{\frac{2 \cdot (P_2 - P_3)}{\rho}} \quad \text{[Formula 3]}$$

In the formulae, $c_1$ is the flow rate coefficient of the filter disposed at the gas injection port 11i, $d_{in}$ is the diameter of the gas injection port 11i, $P_1$ is the gas pressure inside of the injection nozzle 50, $P_2$ is the gas pressure inside of the enclosure 10, and $P_1$-$P_2$ is the pressure loss in the filter disposed at the gas injection port 11i. Furthermore, $c_2$ is the flow rate coefficient of the filter disposed at the gas expulsion port 11e, $d_{out}$ is the diameter of the gas expulsion port 11e, $P_3$ is the gas pressure inside of the suction nozzle 55, and $P_2$-$P_3$ is the pressure loss in the filter disposed at the gas expulsion port 11e. It should be noted that the flow rate $Q_1$ of He which is supplied to the gas injection port 11i may, for example, assume a value for which the overall flow rate of He detected by means of the flow rate control valve 65 is divided by the number of enclosures 10 which are set up at the fixtures 81-84.

The flow rate controller 67 controls the flow rate control valve 65 and evacuation control valves 91-94 in such a way that the resulting gas pressure $P_2$ inside of the enclosure 10 does not fall below the vapor pressure of the liquid organic compounds which are present inside of the enclosure 10. Here, a typical example of a liquid organic compound which is present inside of the enclosure 10 is grease and the like which is used in the spindle motor 3. Aside from grease, there may be lubricant which is coated on the surface of the magnetic disk 2, among other things. It is possible in this way to suppress vaporization of the liquid organic compounds by managing the gas pressure $P_2$ inside of the enclosure 10 in such a way that it does not fall below the vapor pressure of the liquid organic compounds which are present inside of the enclosure 10.

Furthermore, the gas pressure $P_2$ inside of the enclosure 10 is preferably managed in such a way that it does not fall below atmospheric pressure. Since substances which are liquid at atmospheric pressure are used as the liquid organic compounds present inside of the enclosure 10, it is possible to deal with any kind of liquid organic compounds by managing the gas pressure $P_2$ inside of the enclosure 10 in such a way that it does not fall below atmospheric pressure. Furthermore, it is possible to restrict inflow of air into the enclosure 10 immediately after the He has been injected by raising the gas pressure $P_2$ inside of the enclosure 10 to above atmospheric pressure, and this can be maintained for the period of time until the temporary seals 42, 44 are affixed in the subsequent steps (S9, S10).

It should be noted that in this embodiment of the present technology, the gas pressure $P_2$ inside of the enclosure 10 is obtained by applying the gas pressure $P_1$ detected inside of the injection nozzle 50 and the gas pressure $P_3$ detected inside of the suction nozzle 55 to the abovementioned formula 1, but this embodiment is not limiting, and it is possible to directly detect the gas pressure $P_2$ inside of the enclosure 10 by providing a pressure sensor inside of the enclosure 10, for example. Returning to the description of S8 and FIG. 6, the filter 24 which is disposed at the gas expulsion port 11e preferably undergoes a greater pressure loss than the breathing filter 22 which is disposed at the gas injection port 11i.

Furthermore, the gas expulsion port 11e preferably has a smaller diameter than the gas injection port 11i. In such cases, gas flows less readily through the gas expulsion port 11e than through the gas injection port 11i, and therefore the gas pressure inside of the enclosure 10 readily increases when the He is injected. This means that it is possible in such cases to restrict the inflow of air into the enclosure 10 immediately after the He has been injected, and this can be maintained for the period of time until the temporary seals 42, 44 are affixed in the subsequent steps (S9, S10).

In addition, the injection of He in S8 may be carried out while the magnetic disk 2 housed inside of the enclosure 10 is caused to rotate by the driving of the spindle motor 3 from outside. This makes it easier for the He injected from the gas injection port 11i to diffuse inside of the enclosure 10, allowing for more efficient He filling.

If the He is injected while the magnetic disk 2 is caused to rotate in this manner, the gas inside of the enclosure 10 flows in the direction of rotation around the periphery of the magnetic disk 2, and therefore the gas injection port 11i and gas expulsion port 11e are preferably provided along the edge of the magnetic disk 2. Furthermore, the gas injection port 11i and gas expulsion port 11e are preferably provided at least a fixed distance apart in the direction of rotation of the magnetic disk 2 so that the He which is injected from the gas injection port 11i is caused to diffuse sufficiently inside of the enclosure 10. For this reason, the gas injection port 11i and gas expulsion port 11e are preferably provided on mutually opposing sides of the magnetic disk 2, as in this embodiment of the present technology.

Furthermore, if the He is injected while the magnetic disk 2 is caused to rotate, it is possible to evaluate the He concentration inside of the enclosure 10 on the basis of the magnitude of the drive current output to the spindle motor 3. That is to say, as the He concentration inside of the enclosure 10 increases, the extent of the resistance exerted on the rotating magnetic disk 2 decreases, which means that the magnitude of the drive current needed to cause the spindle motor 3 to rotate at a certain speed is reduced. The magnitude of the drive current output to the spindle motor 3 can therefore be taken as an indicator of the He concentration inside of the enclosure 10.

Here, the He is injected in such a way that the rate of change over time of the drive current when the He is injected into the enclosure 10 is greater than the rate of change over time of the drive current when the temperature inside of the enclosure 10 changes, as shown in formula 4 below.

$$\frac{\Delta i_{he}}{\Delta t} > \frac{\Delta i_{temp}}{\Delta t} \quad \text{[Formula 4]}$$

In the formula, $\Delta i_{he}$ is the amount of variation in the drive current when He is injected into the enclosure 10. $\Delta i_{temp}$ is the amount of variation in the drive current when the temperature inside the enclosure 10 changes (when a prescribed amount of heat is applied, for example). $\Delta t$ is the period of time for which He is injected into the enclosure 10.

Here, variations in the drive current due to changes in the temperature inside the enclosure 10 are normally far greater than variations in the drive current due to changes in the He concentration inside the enclosure 10, which means that it is normally difficult to evaluate the He concentration inside the enclosure 10 on the basis of the drive current. It is therefore possible to evaluate the He concentration without taking account of the temperature change inside the enclosure 10 by injecting He at a higher rate than the rate of temperature change inside the enclosure 10 (injecting He over a short period of time) in order to satisfy formula 2 above.

It should be noted that this is not the only way of evaluating the He concentration inside the enclosure, and it is equally feasible to place an oxygen sensor inside of the enclosure 10 and to utilize the oxygen concentration detected inside of the enclosure 10, for example. That is to say, the He and oxygen inside of the enclosure 10 have an exclusive relationship, and therefore the He concentration inside of the enclosure 10 can be evaluated on the basis of the oxygen concentration inside of the enclosure 10. In this way, the oxygen concentration inside of the enclosure 10 can be taken as an indicator of the He concentration inside of the enclosure 10.

Figure 7:
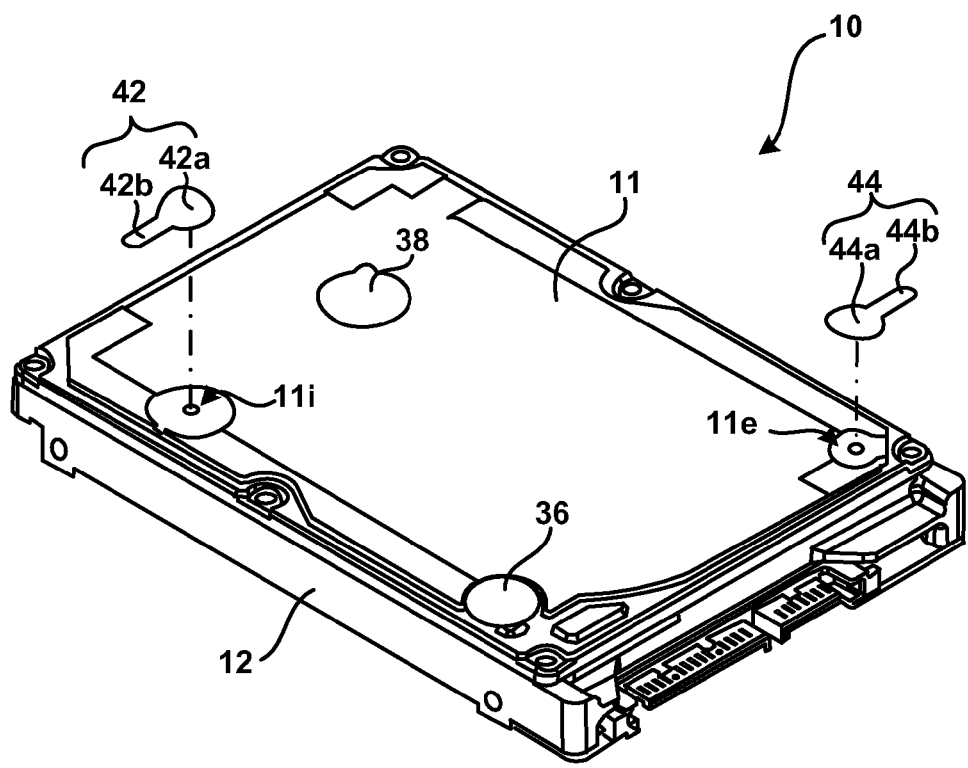
FIG. 7 is an oblique view of an enclosure in which temporary seals are affixed, in accordance with one embodiment of the present technology.

Once the abovementioned He injection step (S8) is complete, and before self-servo write (S12) begins, the temporary seals 42, 44 are affixed in order to temporarily close off the gas expulsion port 11e and gas injection port 11i (S9, S10) as shown in FIG. 7. This is done in order to suppress leakage of He from inside of the enclosure 10 while self-servo write (S12) is being carried out.

Furthermore, the temporary seal 44 which closes off the gas expulsion port 11e is affixed before the temporary seal 42 which closes off the gas injection port 11i (i.e., Tb<Ta). This is because the filter 24 which is disposed at the gas expulsion port 11e has lower leakage resistance than the breathing filter 22 disposed at the gas injection port 11i.

Furthermore, if Te is the specified time until the He concentration inside of the enclosure 10 drops to below the permitted range when the gas injection port 11i and gas expulsion port 11e have not been closed off after the He has been injected into the enclosure 10, then the times (Ta, Tb) until the temporary seals 42, 44 are affixed after the He has been injected into the enclosure 10 should not exceed Te. If the specified time Te is exceeded, S8 is returned to, and He is once again injected (S11).

In S12, the magnetic head 4 and voice coil motor 7 which are housed inside of the hermetically-sealed enclosure 10 are externally controlled in order to write servo data to the magnetic disk 2, in other words self-servo write (SSW) is carried out.

The magnetic head 4 and voice coil motor 7 are controlled by means of an external servo data recording device, via the connector 9 and FPC 8 inside of the enclosure 10. Specifically, the servo data recording device outputs servo data to be written to the magnetic disk 2 to the magnetic head 4. Furthermore, the magnetic head 4 acquires servo data read out from the magnetic disk 2. In addition, drive signals for the voice coil motor 7 are generated for output in accordance with the servo data acquired.

Furthermore, writing of the servo data makes use of the fact that a recording element and a reproduction element contained in the magnetic head 4 are offset in the diametric direction of the magnetic disk 2, and servo data is written in with the magnetic head 4 being made to follow preformed tracks, whereby new tracks are formed. That is to say, servo data is read out by the reproduction element from the preformed tracks, and the magnetic head 4 is made to follow the tracks in accordance with the servo data which has been read out. In this state, servo data is written in by the recording element in order to form new tracks. These tracks are formed in the radial direction of the magnetic disk 2.

Here, the inside of the enclosure 10 is filled with He by means of the He injection step (S8), and therefore it is possible to form tracks in the magnetic disk 2 which are close to a perfect circle and with little distortion.

Furthermore, the breathing filter 22 and filter 24 are disposed at the gas injection port 11i and gas expulsion port 11e in the enclosure 10, and the temporary seals 42, 44 are affixed respectively thereto, and therefore it is possible to suppress leakage of He from inside of the enclosure 10; as a result, self-servo write can be carried out while the enclosure 10 is placed in a normal area.

Furthermore, since the abovementioned He injection step (S8) can also be carried out in a normal area, it is possible to shorten the time from after He injection until self-servo write begins, and as a result self-servo write can be carried out while there is a high concentration of He inside of the enclosure 10.

Furthermore, if Tf is the specified time until the He concentration inside of the enclosure 10 drops to below the permitted range when the gas injection port 11i and gas expulsion port 11e have not been closed off after the He has been injected into the enclosure 10, then the time (Tc+Td) until self-servo write is complete after the He has been injected into the enclosure 10 should not exceed Tf.

Once the abovementioned self-servo write (S12) is complete, the temporary seals 42, 44 which close off the gas expulsion port 11e and gas injection port 11i are peeled away (S13, S14).

Furthermore, if Th is the specified time after the He has been injected into the enclosure 10 until He leaks out from the enclosure 10 and changes are apparent in the components, then the time (Tc+Td+Tg) after the He has been injected into the enclosure 10 until the self-servo write is complete and the temporary seals 42, 44 have been peeled away should not exceed the specified time Th. The changes in the components caused by leakage of He from the enclosure 10 include, for example, deformation of the cover 11 due to the drop in gas pressure inside the enclosure 10, and transformation of the grease which is applied to the sliding components.

In S15, the gas injection port 11i and gas expulsion port 11e are used in order to inject air into the hermetically-sealed enclosure 10. S15 is carried out in the same way as S8 above. The inside of the enclosure 10 is filled with air in this way after the self-servo write (S12) so that the subsequent pre-process inspection (S18) and test process (S19) are carried out under the same conditions as for the product magnetic disk device 1.

Furthermore, when air is injected into the enclosure 10 from the gas injection port 11i, He is expelled to outside the enclosure 10 from the gas expulsion port 11e, and therefore the He which is expelled from the gas expulsion port 11e is preferably collected for reuse.

Figure 8:
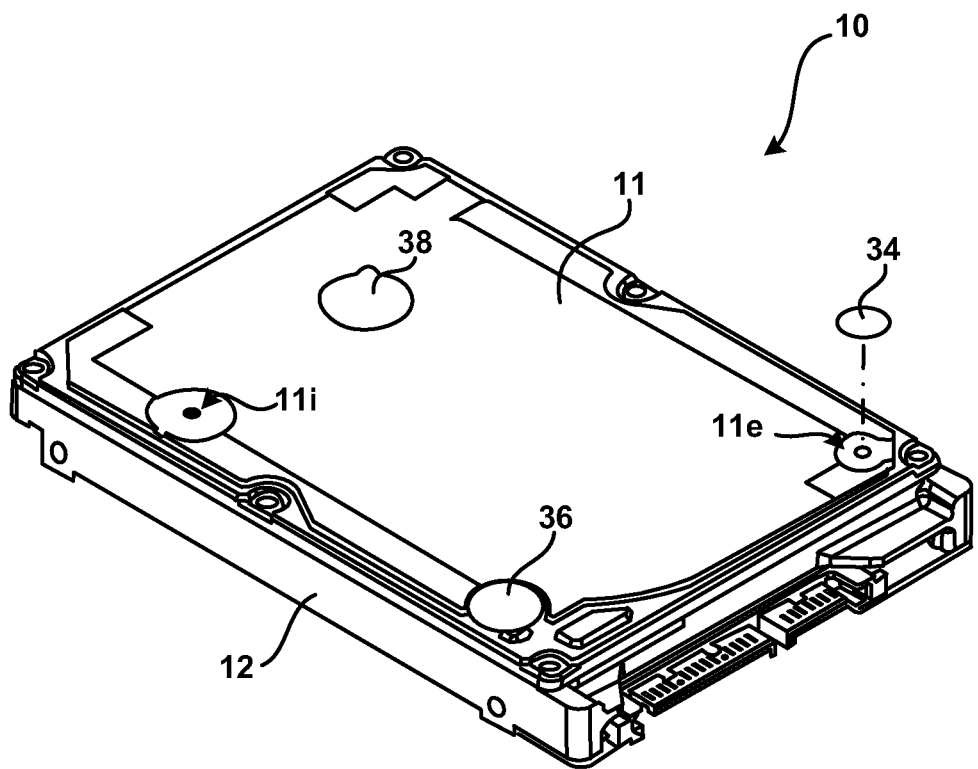
FIG. 8 is an oblique view of an enclosure in which a leak seal is affixed, in accordance with one embodiment of the present technology.

In S16, and as shown in FIG. 8, the leak seal 34 is affixed in order to close off the gas expulsion port 11e. This makes it possible to prevent the ingress of particles into the enclosure 10 from the gas expulsion port 11e in the product magnetic disk device 1. Here, the filter 24 disposed at the gas expulsion port 11e has a lower filtering capacity than the breathing filter 22 disposed at the gas injection port 11i, and therefore the gas expulsion port 11e is closed off.

After this, a circuit substrate is mounted on the rear side of the enclosure 10 (S17), and a specific pre-process inspection (S18) and testing process (S19) are carried out. The magnetic disk device 1 is completed by means of the above steps.

An embodiment of the present technology is described above, but the present invention is not limited to this mode of embodiment, and various modifications may of course be implemented by a person skilled in the art.

What is claimed is:

1. A method for producing a magnetic disk device comprising:
    injecting replacement gas into a hermetically-sealed enclosure by means of an injection nozzle with a first cross sectional area while simultaneously suctioning gas comprising organic compounds from inside of the hermetically-sealed enclosure by means of a suction nozzle with a second cross sectional area smaller than said first cross sectional area, in such a way that a gas pressure inside of the enclosure does not fall below a vapor pressure of the organic compounds present inside of the enclosure, wherein a first volume of said replacement gas being injected is greater than a second volume of said gas comprising organic compounds, wherein said suctioning removes said second volume of said gas comprising the organic compounds,
    wherein the hermetically-sealed enclosure houses within a magnetic disk for storing data, a magnetic head for writing/reading the data, and an actuator for moving the magnetic head relative to the magnetic disk, and wherein a gas injection port and a gas expulsion port are formed in the hermetically-sealed enclosure and provide communication between the inside and outside, and filters are disposed at the gas injection port and gas expulsion port, respectively, wherein said injection nozzle is disposed at the gas injection port and said suction nozzle is disposed at the gas expulsion port.

2. The method of claim 1, wherein the suctioning gas from inside of the hermetically-sealed enclosure by means of the suction nozzle in such a way that the gas pressure inside of the enclosure does not fall below the vapor pressure of the organic compounds present inside of the enclosure comprises:
    suctioning the gas from inside of the enclosure by means of the suction nozzle in such a way that the gas pressure inside of the enclosure does not fall below atmospheric pressure.

3. The method of claim 2, further comprising:
    detecting gas pressure inside of the injection nozzle and the gas pressure inside of the suction nozzle;
    obtaining the gas pressure inside of the enclosure, wherein the detecting and obtaining are performed based on the following formula [1], $$\left(\frac{c_1}{c_2}\right)^2 \cdot \left(\frac{d_{in}}{d_{out}}\right)^4 = \frac{P_2 - P_3}{P_1 - P_2}$$

wherein, $P_1$ is the gas pressure inside of the injection nozzle, $P_2$ is the gas pressure inside of the enclosure, $P_3$ is the gas pressure inside of the suction nozzle, $d_{in}$ is the diameter of the gas injection port, $d_{out}$ is the diameter of the gas expulsion port, $c_1$ is the flow rate coefficient of the filter disposed at the gas injection port, and $c_2$ is the flow rate coefficient of the filter disposed at the gas expulsion port.

4. The method of claim 1, wherein the injecting the replacement gas comprises:
    causing the magnetic disk to rotate while the replacement gas is being injected.

5. The method of claim 1, wherein the injecting replacement gas into the hermetically-sealed enclosure by means of the injection nozzle comprises:
    injecting replacement gas that is a low-density gas of lower density than air into the hermetically-sealed enclosure by means of the injection nozzle.

6. The method of claim 5, further comprising:
    after the injection of the replacement gas that is low-density gas of lower density than air into the hermetically-sealed enclosure by means of the injection nozzle, controlling the magnetic head and actuator in order to write servo data to the magnetic disk.

7. The method for producing a magnetic disk device of claim 5, further comprising:
> while the low-density gas of lower density than air is being injected into the hermetically-sealed enclosure, in order to evaluate a concentration of the low-density gas inside of the hermetically-sealed enclosure, acquiring an indicator which varies in accordance with the concentration of low-density gas inside of the hermetically-sealed enclosure.

8. The method of claim 7, wherein the indicator is a magnitude of a drive current supplied to a motor in order to cause rotation of the magnetic disk.

9. The method of claim 7, wherein the indicator is an oxygen concentration inside of the hermetically-sealed enclosure.

* * * * *